INVENTOR.
ELBERT NEIL SHAWHAN

INVENTOR.
ELBERT NEIL SHAWHAN
BY
ATTORNEYS

United States Patent Office 2,906,949
Patented Sept. 29, 1959

2,906,949

FLOW CHANGE DETECTING MEANS

Elbert Neil Shawhan, Newtown Square, Pa., assignor to Sun Oil Company, Philadelphia, Pa., a corporation of New Jersey Application October 10, 1955, Serial No. 539,300

12 Claims. (Cl. 324—61)

This invention relates to flow change detecting means and has particular reference to the detection of change of composition of liquids or other materials flowing in pipe lines or similar conduits.

In pipe lines for the remote delivery of hydrocarbon products it is customary to deliver through the same pipe line products of different compositions in sequence and in such cases it is necessary to determine at the delivery end of the line when the passage of one composition has terminated and that of a different composition has begun. For this purpose various means have been devised such as the insertion into the pipe line of colored slugs of one of the compositions so that by watching the passage of the compositions in a sight glass the boundary may be ascertained and the necessary selective valving carried out to route properly the several compositions. It is one object of the present invention to provide apparatus for doing this without any tampering in any way with the compositions being transported. Briefly this result is accomplished by capacitance measurements inasmuch as compositions of different types will in general, exhibit rather different dielectric constants.

The invention, however, is not limited to pipe lines for remote delivery of materials. In plants such as hydrocarbon refining plants it is also desirable to maintain a check on the compositions which are flowing through pipes for the purpose, for example, of controlling the processing in the event that the composition changes to an undesirable extent.

While it has been recognized that capacitance changes indicative of different dielectric constants, could be so used, difficulties have arisen in practice due to the fact that capacitance has generally had to be measured locally because distant transmission of signals has involved the high capacitances of transmission lines masking the rather slight changes of capacitance which must be detected or measured. An object of the present invention is the provision of apparatus which may be used for the detection of capacitance changes and in particular the exhibition of such changes at remote positions. The measurement of capacitance necessarily involves electrical circuitry. Particularly in such applications as those to hydrocarbon products, this entails the hazard of sparking and explosion. It is, therefore, another object of the invention to provide a system which may detect variations in composition by capacitance measurements while involving the flow of very small currents at very small voltages so that no substantial explosion hazard is involved.

The attainment of the foregoing objects together with the attainment of other objects particularly relating to details of construction and operation will become apparent from the following description read in conjunction with the accompanying drawing in which.

Figure 1:
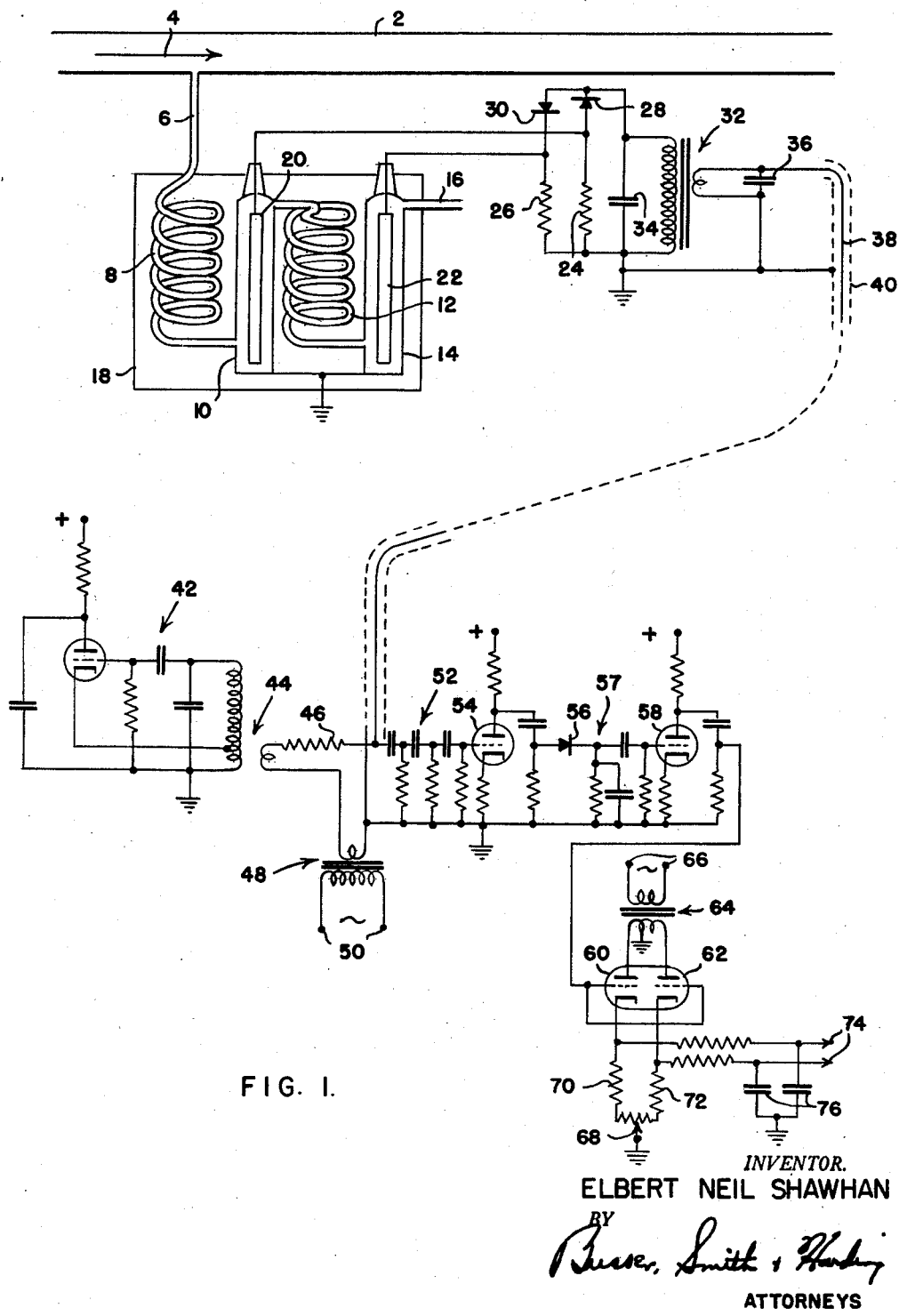
Figure 1 is a wiring diagram showing one embodiment of the invention particularly adapted to certain circumstances.

Referring first to Figure 1, there is indicated an arrangement for the detection of change of composition of a liquid, such as a hydrocarbon mixture, flowing through a pipe line 2 in the direction of the arrow 4. The material flowing in the pipe line is continuously sampled through a pipe 6 and apparatus which will now be described, the sampled material being either returned to the pipe line or, if in negligible small quantities run to waste or separately collected. It will be assumed that a sufficient pressure exists in the pipe line to provide a pressure gradient between the sampling connection 6 and the point of the discharge of the sample. Flow from connection 6 is shown as taking place through a series arrangement of a coil 8, a capacitance cell 10, another coil 12, and a second capacitance cell 14 to the discharge pipe 16. If a sufficient pressure gradient exists locally in the pipe line, or is produced by providing an orifice, the discharge 16 may communicate with the pipe line downstream of the inlet 6. The sampling apparatus just described is desirably embodied in a constant temperature bath 18, the coils 8 and 12 being provided for the purpose of bringing the samples to a definite temperature before measurement takes place in the cells 10 and 14 which are also desirably within the bath. The coil 12 has an additional function of providing a time lag between the leaving of the cell 10 of a particular portion of the sampled liquid and its entrance into the cell 14.

The cells are in the form of metallic shells or enclosures which are grounded to form in each case one plate of a capacitor. The other plates are provided by the conductors 20 and 22 located within the cells. The samples taken from the pipe line then constitute the dielectrics of the cells and the capacitances measured will be dependent upon the dielectric constants of the samples.

The conductors 20 and 22 are insulated from the casings of the cells and are respectively connected to ground through resistors 24 and 26. They are also connected through the oppositely arranged diodes 28 and 30 to the ungrounded terminal of the secondary of a transformer 32, which secondary is desirably shunted by a capacitance 34 to tune the circuit approximately to resonance at the frequency of an alternating supply which will be shortly described. The primary of the transformer 32, which is also shunted by a tuning condenser 36, has one terminal grounded and the other terminal connected to the central conductor 38 of a coaxial cable the sheath of which, indicated at 40, is grounded. The electrical elements just described are the only ones which need be local to the pipe line and to the cells 10 and 14. Remote indications are provided through the coaxial cable which may be quite long and may run to some central control station or the like at a great distance from the sampling point. As will later more fully appear, the currents and potentials existing in the apparatus local to the pipe line may be very small so as to involve no hazard from the standpoint of possible causation of fire or explosion.

A conventional exciting oscillator is indicated at 42. Desirably this provides a supply of relatively high frequency alternating current. The frequency is by no means critical but is desirably substantially higher than the usual sixty-cycle power supply frequency which may conveniently be utilized in the apparatus. If desired the range of frequency may be from a moderately high audio frequency up to high or ultrahigh radio frequencies.

The oscillator is coupled through a transformer arrangement indicated at 44 and a resistor 46 to the central conductor 38 of the coaxial cable. In series with this secondary to ground is shown the secondary of a transformer 48 excited from the terminals 50 supplied with the available commercial alternating frequency such as sixty cycles. Between the conductor 38 and ground there is located the filter arrangement indicated at 52 which has high pass characteristics serving to isolate to a considerable degree the coaxial cable connection from an amplifier which is conventionalized as a triode 54 in a usual circuit. The output of the amplifier is fed to a diode 56 which is followed by a resistance-capacitance network 57 serving to bypass high frequency components to ground. An amplifier embodying a triode 58 receives the resulting signal and delivers it to the synchronous rectifier comprising the triodes 60 and 62, the anodes of which are connected to the respective ends of the secondary of a transformer 64 which is excited from terminals 66 at the same frequency, for example, sixty cycles, as that supplied to the transformer 48. It will be noted that the center of the secondary winding of this transformer is grounded, and that the grids of the triodes are connected together and to the output of the amplifier. The cathodes of the triodes are connected in cathode follower arrangement with resistors 70 and 72 to ground with the interposition of a potentiometer 68 for balancing. Outputs are taken through suitable resistors to output terminals 74 which are respectively connected to ground through capacitors 76.

The circuit arrangement which has been described is merely typical of a large number of circuit arrangements for the remote measurement of capacitances which are fully described in my application, Serial No. 449,437, filed August 12, 1954. Details of operation are set forth in said application and need not be repeated here. It will suffice to point out that the input through the transformer 32 to the capacitance cells and the diodes 28 and 30 from the apparatus shown in the lower portion of Figure 1 comprises a combination of high frequency from the oscillator 42 and low frequency from the transformer 48. The latter acts as a switching frequency for the diodes 28 and 30, these diodes being rendered alternately conductive in dependence upon the half cycle of the low frequency input which is flowing. While conducting, the corresponding capacitance cells are alternately effectively inserted into the circuit, with the result that the input to amplifier triode 54 is in the form of a modulated wave which in the respective half cycles of the low frequency excitation contains components in the form of a modulating high frequency dependent upon the capacitance values in the cells 10 and 14. The diode 56 effects rectification of the modulated signal and the synchronous rectifier constituted by the triodes 60 and 62 and their connections provides DC potentials at the capacitors 76 and output terminals 74 which are also dependent upon the capacitances 10 and 14. The difference of these output potentials may be indicated by an ordinary direct current meter or the outputs may be utilized to operate relays, valves or other controls as may be desired.

The overall operation is as follows:

So long as a constant composition is flowing through the pipeline and sampled into the cells 10 and 14, the outputs appearing at terminals 74 will remain constant and will generally indicate nothing more than the differences in capacitances of the cells 10 and 14 if the difference in output voltage is measured. The differences, for example, may involve only the physical differences in dimensions of the cells. The constant difference thus resulting is indicated at 78 in Figure 2.

If now a material of different composition reaches the sampling point, it will flow through the sampling connection 6 and coil 8 into the first cell 10 while the coil 12 and the second cell 14 still contain the original composition. As the cell 10 fills with the new composition, the difference voltage appearing at the terminals 74 will change as indicated at 80 in Figure 2. When the cell 10 is filled with the new composition and the boundary between the compositions is passing through the coil 12 the voltage difference will become constant at a value different from the original as indicated at 82. Then as the second cell fills with the new composition there will be a change of voltage difference as indicated at 84, and finally when both cells contain the second composition there will again be a constant difference as indicated at 86 which may or may not be the same as the difference originally obtained at 78.

Figure 2:
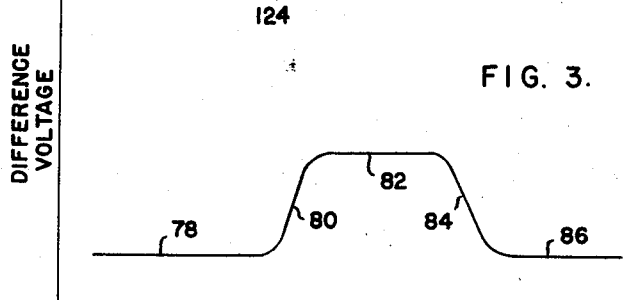
Figure 2 is a diagram indicating the type of signal produced in the operation of the apparatus of Figure 1.

In effect the apparatus detects the difference in the dielectric constant of the two compositions in the region graphically indicated at 80, 82 and 84. To eliminate spurious results which might result from temperature differences, it is desirable to provide the constant temperature bath indicated at 18 so that the sole variable which is detected is the dielectric constant. The coil 12 has the second function, however, of delaying the entry of the second composition into the cell 14 following its filling of the cell 10. A definite pulse is thus secured in the difference voltage as indicated in Figure 2 serving to identify the passage of the boundary between the two compositions past the sampling point. The arrangement just described is particularly desirable where such a boundary is desirably determined at a single location at which there may be the cells 10 and 14 along with the apparatus and the detecting end of the coaxial cable. For best reliability of the apparatus shown in Figure 1 the diodes 28 and their circuit must be closely adjacent to each other and to the cells 10 and 14, there being avoided any long leads between the diodes and the cells or other parts of the transmitting portion of the apparatus.

Figure 3:
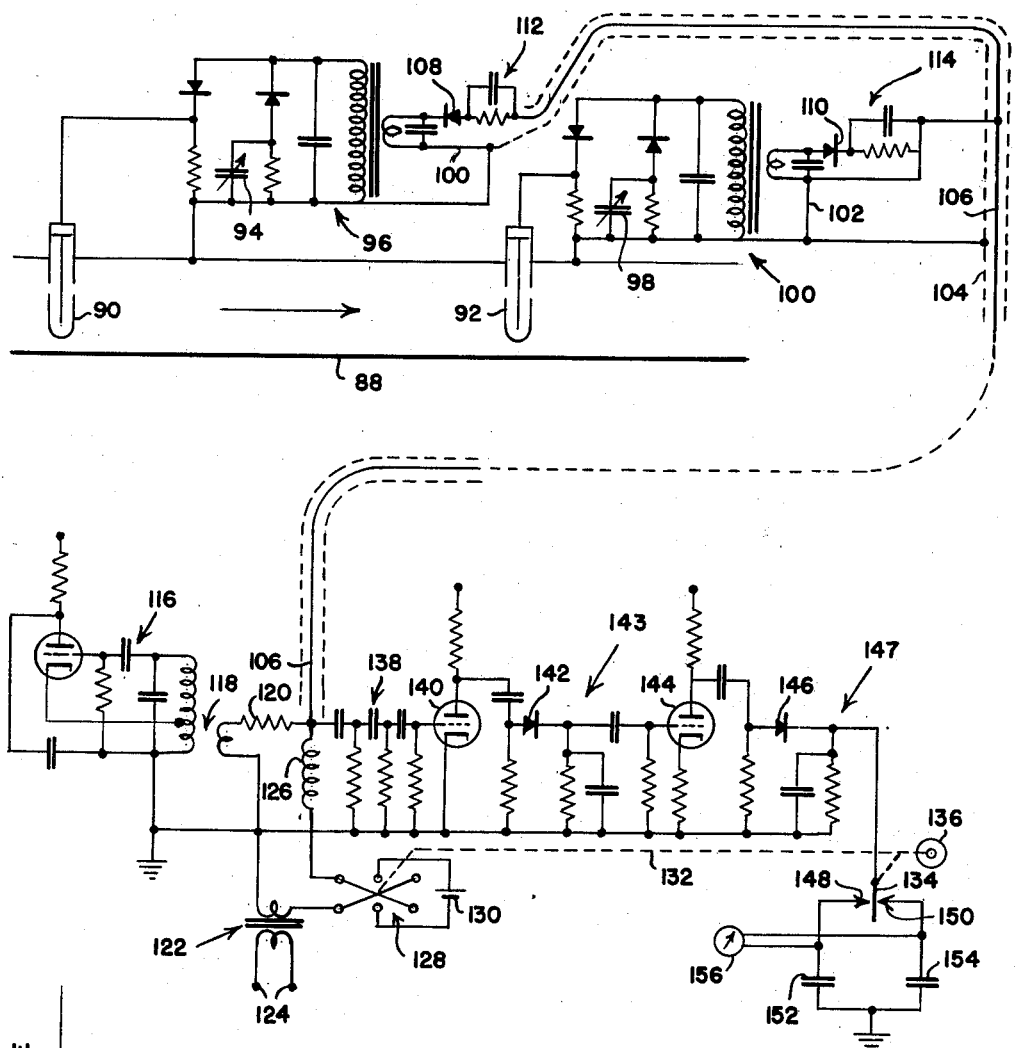
Figure 3 is a wiring diagram showing an alternative embodiment of the invention.

Under certain circumstances, however, it is not desirable to bleed from the pipe line samples as described but rather it would be desirable to make the measurements in the pipe line itself. In such case, since particularly in a long pipe line there is inevitable diffusion of the two compositions in the vicinity of their boundary, it is necessary to provide the capacitance cells in the pipe line at substantial spacing from each other in order that at the general time of passage of the boundary the two cells will contain compositions having as much difference of dielectric constant as possible. Figure 3 shows an arrangement which may be used under these circumstances and which, in particular, permits the capacitance cells to be substantially spaced from each other. The pipe line is indicated at 88 and is shown as comprising in its interior the upstream and downstream capacitance cells indicated at 90 and 92. Each of these may comprise a sheath of metal grounded to the pipe line and provided with openings for the free entry and exit of the flowing material. Each of them also comprises a central conductor, insulated from ground, as in the case of the capacitance cells previously described. Associated with each of the cells is a capacitance comparing device similar to that previously described, these devices being indicated at 96 and 100. In each case, however, instead of comparing the two capacitances resulting at the cells 90 and 92, each of these is compared with a reference capacitance, these being indicated at 94 and 98. Desirably these are provided by adjustable capacitors 94 and 98 capable of maintaining the adjusted capacitance values. They may, in fact, be provided by other closed cells located in the pipe line and permanently filled with some dielectric material having temperature coefficient characteristics similar to the materials flowing in the pipe line so as to eliminate the effects of temperature variations. The transformers in this instance have their primaries connected at one side to ground as indicated at 100 and 102 and their other sides connected to oppositely arranged diodes 108 and 110 and then through resistance-capacitance arrangements 112 and 114 to the central conductor 106 of a coaxial cable the sheath 104 of which is grounded.

The receiving assembly as the other end of the coaxial cable is generally similar to that described in connection with Figure 1 and comprises an oscillator 116 providing high frequency excitation through the transformer 118 and resistor 120 to the central conductor of the coaxial cable. In this case the lower terminal of the transformer secondary is grounded. The secondary of the transformer 122, provided at terminals 124 with commercial alternating, for example sixty-cycle, current, is connected in series with a reversing switch 128 and the radio frequency choke 126 to the conductor 106 of the cable. The reversing switch 128 is connected to a battery 130 to provide reversed potential between ground and the conductor 106 with superposition of the low frequency from the transformer 122. Desirably the reversing switch is in the form of a commutator arrangement driven from a motor 136 at a low frequency cycling rate through the connection 132 which also serves to drive synchronously with the cycling rate a switch 134 between contact points 148 and 150. The conductor 106 is connected through the high pass filter 138 to the amplifier triode 140 which delivers its signal through the detector diode 142 to the amplifier triode 144 which in turn delivers its signal through a second detector diode 146 to the switch 134. The first detector 142 is followed by an RC network 143 arranged to pass to ground the high frequency signal originating in the oscillator 116, while the second diode detector 146 is followed by the RC network 147 arranged to by-pass to ground the frequency originating at the detector 142.

The contacts 148 and 150 are respectively connected to the ungrounded terminals of capacitors 152 and 154 which accumulate direct charges which may be measured by a meter 156 or used for control purposes in obvious fashion.

The operation of the arrangement shown in Figure 3 is as follows:

When the reversing switch 128 is in one position it renders conductive one of the diodes 108 and 110, and when it is in its alternative position it renders the other diode conductive. Thus the two pickup units associated with the cells 90 and 92 are rendered selectively operative in the successive half-cycles of change of the switch 128. Considering one of the cell assemblies, the capacitance appearing at it or its comparison capacitor 94 or 98, is rendered alternatively effective depending upon the half-cycles of the excitation at low frequency from the transformer 122. A quadruple switching arrangement is thus provided in which in the long half-cycles of change of switch 128 either the left-hand or the right-hand pickup assembly effects delivery of signals. In each of these half-cycles there is a further distinction between the signals produced at the corresponding pipe line capacitance and the associated reference capacitance. The switch 134 acts as a synchronous rectifier at the low frequency cycle of the reversing switch 128, and the capacitors 152 and 154 accordingly accumulate potentials each representing the difference of capacitance between a corresponding one of the cells 90 and 92 and its associated fixed capacitance 94 or 98.

In operation, while a single composition is flowing continuously past and through both the cells, the capacitances at 94 and 98 wil desirably be adjusted to secure a zero output on the meter 156 which indicates the differences of potentials accumulated on capacitances 152 and 154. As a boundary passes through the pipe line, the new composition will first fill the cell 90. The result will be that the capacitance at 90 will change with respect to the capacitance at 94 producing a change corresponding to the difference involved at the corresponding capacitor of the pair 152 and 154. This will then produce at the meter 156 a change corresponding to that indicated at 80 in Figure 2. After the cell 90 is filled and the boundary flows between the cells, there will be a constant reading such as indicated at 82. Then, when the cell 92 begins to receive the second composition its capacitance with respect to the fixed comparison capacitance 98 will change in the same sense as the change which had occurred previously at cell 90. The result will be that the capacitance or the corresponding capacitor 152 or 154 will change in the same sense as that on the other capacitor. The result will be that the difference of potentials will again drop to produce a variation corresponding to 84 in Figure 2. Thus the arrangement gives indications for output signals which may be used for control of the same general type as the modification first described.

It will be noted that the two modifications differ in that the capacitances 90 and 92 may be widely separated in the second modification. At the same time the diode circuitry associated with each of these remains close to it and no errors in capacitance indication or measurement are involved despite the fact that the two cells 90 and 92 and their immediately associated circuits may be widely spaced along the pipe line.

It may be noted that the receiving arrangements of both the modifications in Figures 1 and 3 may well be provided for selective association with a number of coaxial cables running to different detecting locations at different pipe lines or branches thereof or to remotely spaced positions in a single pipe line. Selective switching may, of course, be used to secure selective readings from the different pickup arrangements. It is in general unnecessary to monitor continuously the flow of the liquids through a pipe line since with knowledge of the quantities of each composition flowing there may be made at least an approximate estimate as to the time of arrival of a boundary. Thus it becomes feasible to use the selective switching arrangement described with saving of duplication of the entire apparatus for each sensing station.

It will be evident that various changes in details may be made without departing from the invention as defined in the following claims.

What is claimed is:

1. Apparatus for the detection of changes of fluid flow comprising means providing a flow conduit, a pair of impedances associated with the conduit having upstream and downstream relationship to each other and variable in accordance with local changes of properties of fluid flowing in the conduit, means providing with said impedances individually a pair of circuits having similar characteristics and including elements having non-linear voltage-current characteristics, a common transmission line electrically associated at one end of its ends with said circuits, means providing through said transmission line alternating excitation current to said circuits, and means electrically associated with the other end of said transmission line and responsive through the transmission line to said circuits to provide an output indicative of the relationship of said impedances.

2. Apparatus according to claim 1 in which said non-linear elements are oppositely polarized in said circuits.

3. Apparatus according to claim 2 in which said non-linear elements are diodes.

4. Apparatus according to claim 1 provided with means for rendering said circuits alternately active.

5. Apparatus according to claim 4 in which the means for rendering said circuits alternately active comprises means providing signals through said transmission line to said circuits.

6. Apparatus according to claim 4 in which the means for rendering said circuits alternately active comprises means providing alternating signals through said transmission line to said circuits.

7. Apparatus for the detection of changes of fluid flow comprising means providing a flow conduit, a pair of impedances associated with the conduit having upstream and downstream relationship to each other and variable in accordance with local changes of properties of fluid flowing in the conduit, means providing with said impedances individually a pair of circuits having similar characteristics, a common transmission line electrically associated at one of its ends with said circuits, means providing through said transmission line alternating excitation current to said circuits, means for rendering said circuits alternately active, and means electrically associated with the other end of said transmission line and responsive through the transmission line to said circuits to provide an output indicative of the relationship of said impedances.

8. Apparatus according to claim 7 in which the means for rendering said circuits alternately active comprises means providing signals through said transmission line to said circuits.

9. Apparatus according to claim 7 in which said means for rendering said circuits alternately active does so cyclically at a frequency substantially less than the excitation current frequency.

10. Apparatus according to claim 8 in which said means for rendering said circuits alternately active does so cyclically at a frequency substantially less than the excitation current frequency.

11. Apparatus according to claim 1 in which said impedances are provided by capacitances having the fluid as their dielectric.

12. Apparatus according to claim 7 in which said impedances are provided by capacitances having the fluid as their dielectric.

References Cited in the file of this patent
UNITED STATES PATENTS

| | | |
|---|---|---|
| 2,426,625 | Lindberg | Sept. 2, 1947 |
| 2,577,612 | Fay | Dec. 4, 1951 |
| 2,724,798 | Hare | Nov. 22, 1955 |
| 2,737,469 | Anderson | Mar. 6, 1956 |
| 2,747,095 | Boucke | May 22, 1956 |